US011987466B2

(12) United States Patent
Izaki et al.

(10) Patent No.: US 11,987,466 B2
(45) Date of Patent: May 21, 2024

(54) SHEET PROCESSING APPARATUS AND IMAGE FORMING SYSTEM

(71) Applicant: CANON KABUSHIKI KAISHA, Tokyo (JP)

(72) Inventors: Takao Izaki, Shizuoka (JP); Jun Agata, Shizuoka (JP); Yasuhiro Nakahara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 17/724,926

(22) Filed: Apr. 20, 2022

(65) Prior Publication Data

US 2022/0348432 A1 Nov. 3, 2022

(30) Foreign Application Priority Data

Apr. 28, 2021 (JP) ................................ 2021-076349

(51) Int. Cl.

*B26F 1/06* (2006.01)
*B65H 35/00* (2006.01)
*B65H 43/00* (2006.01)

(52) U.S. Cl.

CPC ........... *B65H 35/0073* (2013.01); *B26F 1/06* (2013.01); *B65H 43/00* (2013.01); *B65H 2403/42* (2013.01); *B65H 2403/72* (2013.01); *B65H 2513/10* (2013.01); *B65H 2801/06* (2013.01)

(58) Field of Classification Search

CPC ........................... B65H 35/0073; B65H 43/00; B65H 2403/42; B65H 2403/72; B65H 2513/10; B26F 1/06

USPC ...................................................... 270/58.07

See application file for complete search history.

(56) References Cited

U.S. PATENT DOCUMENTS

| | | | | |
|---|---|---|---|---|
| 6,295,908 B1 * | 10/2001 | Holzhauser | B26F 1/10 | 83/334 |
| 6,361,036 B1 * | 3/2002 | Nakazawa | B26D 7/015 | 83/167 |
| 6,650,436 B1 * | 11/2003 | Hamamoto | B41J 11/425 | 399/388 |
| 7,628,388 B2 * | 12/2009 | Egawa | B42C 1/12 | 270/32 |
| 7,802,789 B2 * | 9/2010 | Tokita | B26F 1/0092 | 271/265.01 |
| 8,096,543 B2 * | 1/2012 | Toyoizumi | B65H 29/60 | 270/58.11 |

(Continued)

FOREIGN PATENT DOCUMENTS

JP H10279170 A 10/1998

*Primary Examiner* — Leslie A Nicholson, III

(74) *Attorney, Agent, or Firm* — ROSSI, KIMMS & McDOWELL LLP

(57) ABSTRACT

A sheet processing apparatus includes a first conveyance rotary member, a second conveyance rotary member, a punch member, a sensor, a punch motor, a conveyance motor, a first drive transmission portion including a first number of drive transmission members configured to sequentially transmit driving force of the conveyance motor to the first conveyance rotary member, and a second drive transmission portion including a second number of drive transmission members configured to sequentially transmit driving force of the conveyance motor to the second conveyance rotary member, the second number being larger than the first number.

22 Claims, 7 Drawing Sheets

(56) References Cited

U.S. PATENT DOCUMENTS

| | | | | |
|---|---|---|---|---|
| 8,336,871 | B2 * | 12/2012 | Liao | B65H 3/0669 271/10.04 |
| 10,252,874 | B2 * | 4/2019 | Lim | B65H 5/06 |
| 10,315,880 | B2 * | 6/2019 | Nakano | B65H 29/145 |
| 10,322,902 | B2 * | 6/2019 | Nakano | B65H 31/3027 |
| 11,086,261 | B2 * | 8/2021 | Endo | G03G 15/6582 |

* cited by examiner

SHEET PROCESSING APPARATUS AND IMAGE FORMING SYSTEM

BACKGROUND OF THE INVENTION

Field of the Invention

The present invention relates to a sheet processing apparatus that processes a sheet and an image forming system including the same.

Description of the Related Art

JPH10-279170 A proposes a finisher that is connected to an image forming apparatus such as a printer and performs a punching process on a sheet discharged from an image forming apparatus. The finisher includes a sheet detection sensor that detects a sheet, a conveyance roller pair that conveys the sheet, and punching means that punches the sheet conveyed by the conveyance roller pair. The punching means includes a punch and a die pivotally supported by a casing, and a punch drive motor that synchronously drives the punch and the die.

The punch and the die are stopped at a home position and are on standby, and are started to be driven by the punch drive motor on the basis of detection of a trailing edge of the sheet by the sheet detection sensor. Then, the punch and the die mesh with each other at a predetermined position of a trailing edge portion of the sheet and punch the sheet conveyed by the conveyance roller pair.

However, in the finisher disclosed in JPH10-279170 A, when a leading edge of the sheet is nipped by the conveyance roller pair, the rotational speed of the conveyance rollers fluctuates, and there is a possibility that the sheet detection sensor detects the sheet conveyed in a state where the conveying speed of the sheet is unstable. For this reason, there is a possibility that the drive start timing of the punch and the die deviates from the desired timing, and the punching accuracy decreases.

SUMMARY OF THE INVENTION

According to a first aspect of the present invention, a sheet processing apparatus includes a first conveyance rotary member configured to convey a sheet in a sheet conveyance direction, a second conveyance rotary member disposed downstream of the first conveyance rotary member in the sheet conveyance direction and configured to convey the sheet, a punch member disposed between the first conveyance rotary member and the second conveyance rotary member in the sheet conveyance direction and configured to perform punching on the sheet conveyed by the first conveyance rotary member while rotating, a sensor disposed between the first conveyance rotary member and the punch member in the sheet conveyance direction and configured to change an output value based on presence or absence of the sheet at a detection position, a punch motor configured to be driven based on a detection result of the sensor and drive the punch member, a conveyance motor configured to drive the first conveyance rotary member and the second conveyance rotary member, a first drive transmission portion including a first number of drive transmission members configured to sequentially transmit driving force of the conveyance motor to the first conveyance rotary member, and a second drive transmission portion including a second number of drive transmission members configured to sequentially transmit driving force of the conveyance motor to the second conveyance rotary member, the second number being larger than the first number.

According to a second aspect of the present invention, a sheet processing apparatus includes a first conveyance rotary member configured to convey a sheet in a sheet conveyance direction, a second conveyance rotary member disposed downstream of the first conveyance rotary member in the sheet conveyance direction and configured to convey the sheet, a punch member disposed between the first conveyance rotary member and the second conveyance rotary member in the sheet conveyance direction and configured to perform punching on the sheet conveyed by the first conveyance rotary member while rotating, a sensor disposed between the first conveyance rotary member and the punch member in the sheet conveyance direction and configured to change an output value based on presence or absence of the sheet at a detection position, a punch motor configured to be driven based on a detection result of the sensor and drive the punch member, a conveyance motor configured to drive the first conveyance rotary member and the second conveyance rotary member, a pinion gear fixed to an output shaft of the conveyance motor, an output gear fixed to a drive shaft of the first conveyance rotary member, and an idler gear configured to mesh with the pinion gear and the output gear.

According to a third aspect of the present invention, a sheet processing apparatus includes a first conveyance rotary member configured to convey a sheet in a sheet conveyance direction, a second conveyance rotary member disposed downstream of the first conveyance rotary member in the sheet conveyance direction and configured to convey the sheet, a punch member disposed between the first conveyance rotary member and the second conveyance rotary member in the sheet conveyance direction and configured to perform punching on the sheet conveyed by the first conveyance rotary member while rotating, a sensor disposed between the first conveyance rotary member and the punch member in the sheet conveyance direction and configured to change an output value based on presence or absence of the sheet at a detection position, a punch motor configured to be driven based on a detection result of the sensor and drive the punch member, a conveyance motor configured to drive the first conveyance rotary member and the second conveyance rotary member, an output gear fixed to a drive shaft of the first conveyance rotary member, and a gear fixed to an output shaft of the conveyance motor and meshes with the output gear.

Further features of the present invention will become apparent from the following description of exemplary embodiments with reference to the attached drawings.

DESCRIPTION OF THE EMBODIMENTS

First Embodiment

Overall Configuration

Figure 1:
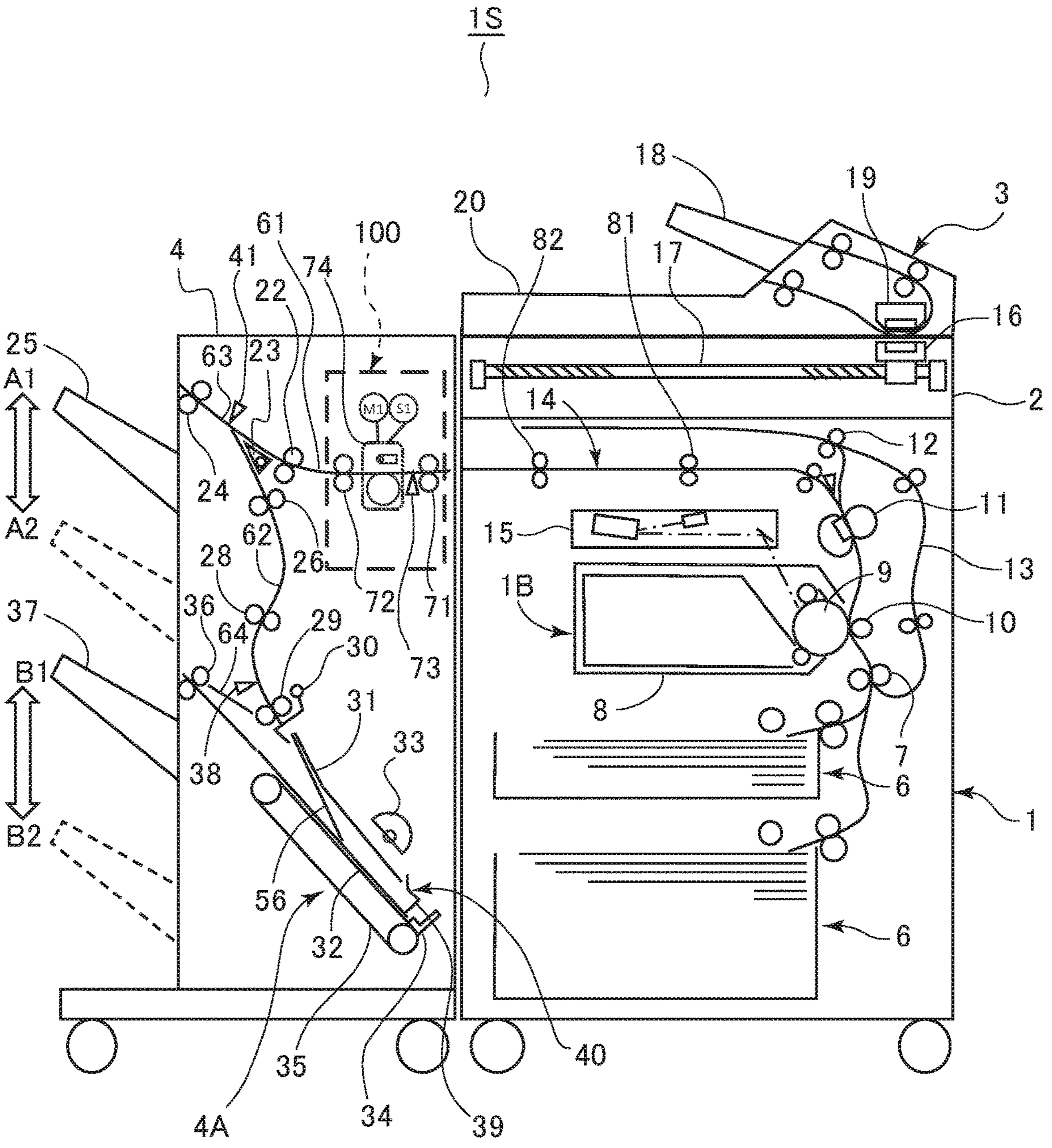
FIG. 1 is an overall schematic view illustrating an image forming system according to a first embodiment.

As illustrated in FIG. 1, an image forming system 1S according to the first embodiment includes an image forming apparatus 1, an image reading apparatus 2, a document feeding apparatus 3, and a sheet processing apparatus 4. The image forming system 1S forms an image on a sheet that is a recording material, and performs processing on the sheet by the sheet processing apparatus 4 as necessary, and outputs the sheet. Hereinafter, the sheet processing apparatus 4 will be described in detail after describing a simple operation of each apparatus. Hereinafter, a driving roller and a roller pair including a driven roller in addition to the driving roller may be simply referred to as a roller.

The document feeding apparatus 3 conveys a document placed on a document tray 18 to image reading units 16 and 19. Each of the image reading units 16 and 19 is an image sensor that reads image information from a document surface, and reads both sides of the document by one document conveyance. The document from which the image information has been read is discharged to a document discharge portion 20. Further, the image reading apparatus 2 can read image information from a still document (including a document that cannot be used by the document feeding apparatus 3, such as a booklet document) set on a document table glass by reciprocating the image reading unit 16 by a driving device 17.

The image forming apparatus 1 is an electrophotographic apparatus including a direct transfer-type image forming unit 1B. The image forming unit 1B includes a cartridge 8 including a photosensitive drum 9 and a laser scanner unit 15 disposed above the cartridge 8. When an image forming operation is performed, the surface of the rotating photosensitive drum 9 is charged, and the laser scanner unit 15 exposes the photosensitive drum 9 on the basis of image information to write an electrostatic latent image on the surface of the drum. The electrostatic latent image carried on the photosensitive drum 9 is developed into a toner image by charged toner particles, and the toner image is conveyed to a transfer portion where the photosensitive drum 9 and a transfer roller 10 face each other. A controller of the image forming apparatus 1 performs an image forming operation by the image forming unit 1B on the basis of image information read by the image reading units 16 and 19 or image information received from an external computer via a network.

The image forming apparatus 1 includes a plurality of feeding devices 6 that feed sheets as recording materials one by one at predetermined intervals. The sheet fed from the feeding device 6 is conveyed to the transfer portion after skew feeding is corrected by a registration roller 7, and the toner image carried on the photosensitive drum 9 is transferred in the transfer portion. A fixing unit 11 is disposed downstream of the transfer portion in a sheet conveyance direction. The fixing unit 11 includes a rotary member pair that nips and conveys a sheet and a heating element such as a halogen lamp for heating a toner image, and performs an image fixing process by heating and pressurizing the toner image on the sheet.

In a case where a sheet on which an image is formed is discharged to the outside of the image forming apparatus 1, the sheet having passed through the fixing unit 11 is conveyed to the sheet processing apparatus 4 by conveyance rollers 81 and 82 disposed in the horizontal conveyance portion 14. In the case of a sheet on which image formation of a first surface has been completed in double-sided printing, the sheet having passed through the fixing unit 11 is delivered to the reverse conveyance roller 12, is switchback conveyed by the reverse conveyance roller 12, and is conveyed to the registration roller 7 again via a re-conveyance portion 13. Then, the sheet passes through the transfer portion and the fixing unit 11 again to form an image on a second surface, and is then conveyed to the sheet processing apparatus 4 by the conveyance rollers 81 and 82 arranged in the horizontal conveyance portion 14.

The image forming unit 1B is an example of an image forming unit that forms an image on a sheet, and an intermediate transfer type electrophotographic unit that transfers a toner image formed on a photosensitive member to a sheet via an intermediate transfer body may be used. Further, a printing unit of an inkjet system or an offset printing system may be used as the image forming unit.

Sheet Processing Apparatus

The sheet processing apparatus 4 includes a punching device 100 that performs a punching process on sheets, performs a punching process on sheets received from the image forming apparatus 1, and discharges the sheets as a sheet bundle. Further, the sheet processing apparatus 4 can simply discharge the sheet received from the image forming apparatus 1 without performing the punching process.

The sheet processing apparatus 4 is provided with a receiving path 61, an inner discharge path 62, a first discharge path 63, and a second discharge path 64 as conveyance paths for conveying sheets, and is provided with an upper sheet discharge tray 25 and a lower sheet discharge tray 37 as discharge destinations for discharging sheets. The receiving path 61 as a first conveyance path is a conveyance path that receives and guides a sheet from the image forming apparatus 1, and the inner discharge path 62 as a second conveyance path is a conveyance path that extends below the receiving path 61 and guides the sheet toward an alignment unit 4A. The first discharge path 63 is a conveyance path that discharges the sheet to the upper sheet discharge tray 25, and the second discharge path 64 as a third conveyance path is a conveyance path that extends from an intermediate stacking portion 40 toward a bundle discharge roller 36 and guides the sheet to the bundle discharge roller 36.

The sheet discharged from the horizontal conveyance portion 14 of the image forming apparatus 1 is received by the punching device 100 disposed in the receiving path 61 and subjected to a punching process. The punching device 100 includes an inlet roller 71 as a first conveyance rotary member, an outlet roller 72 as a second conveyance rotary member, an inlet sensor 73 as a sensor, and a punch unit 74. The sheet discharged from the image forming apparatus 1 is conveyed by the inlet roller 71 and subjected to a punching process by the punch unit 74. The sheet subjected to the punching process is conveyed toward a pre-reverse conveyance roller 22 by the outlet roller 72 disposed downstream of the inlet roller 71 in the sheet conveyance direction. The inlet sensor 73 changes an output value (for example, a voltage value or an output signal) based on the presence or absence of a sheet at a detection position between the inlet roller 71 and the punch unit 74 in the sheet conveyance direction. The pre-reverse conveyance roller 22 conveys the sheet received from the punching device 100 toward the first discharge path 63.

A conveying speed V2 (refer to FIG. 5B, second speed) of the sheet by the inlet roller 71 is set to be higher than a conveying speed V1 (refer to FIG. 5A, first speed) of the sheet by the conveyance rollers 81 and 82 arranged in the horizontal conveyance portion 14. A conveyance roller 82 as a third conveyance rotary member delivers the sheet to the inlet roller 71. Thus, in a case where the inlet roller 71 receives the sheet, the sheet accelerates. One-way clutches 91 and 92 to be described later are installed in a drive transmission path between the conveyance rollers 81 and 82 of the horizontal conveyance portion 14 and a conveyance motor M3 (refer to FIG. 3) as a motor for driving the conveyance rollers. Even if the sheet is pulled by the conveyance rollers 81 and 82 and the inlet roller 71, the sheet is idled by the one-way clutches 91 and 92.

When the sheet discharge destination is the upper sheet discharge tray 25, a reverse conveyance roller 24 discharges the sheet received from the pre-reverse conveyance roller 22 to the upper sheet discharge tray 25. In a case where the discharge destination of the sheet is the lower sheet discharge tray 37, the reverse conveyance roller 24 as the reversing portion performs switchback conveyance for reversing the sheet received from the pre-reverse conveyance roller 22, and conveys the sheet to the inner discharge path 62. A guide member 23 and a branch portion sensor 41 are disposed at a branching portion where the receiving path 61 and the inner discharge path 62 branch from the first discharge path 63 upstream of the reverse conveyance roller 24 in the sheet discharge direction by the reverse conveyance roller 24. The guide member 23 has a function of regulating backflow of the sheet switched back by the reverse conveyance roller 24 into the receiving path 61. The branch portion sensor 41 is provided at a branch portion between the receiving path 61 and the first discharge path 63, and detects that the trailing edge of the sheet has passed the detection position of the branch portion sensor 41. The reverse conveyance roller 24 switches the rotation direction from the forward rotation direction to the reverse rotation direction based on the detection result of the branch portion sensor 41.

An inner discharge roller 26, an intermediate conveyance roller 28, and a kick-out roller 29 as a rotary member pair arranged in the inner discharge path 62 convey the sheet received from the reverse conveyance roller 24 toward the alignment unit 4A while sequentially delivering the sheet. A pre-intermediate stacking sensor 38 detects a sheet between the intermediate conveyance roller 28 and the kick-out roller 29. As the inlet sensor 73, the branch portion sensor 41, and the pre-intermediate stacking sensor 38, for example, an optical sensor that detects the presence or absence of the sheet at the detection position using light or a flag sensor using a flag pressed against the sheet is used.

The alignment unit 4A includes a bundle pressing flag 30, the intermediate stacking portion 40 as a stacking portion, a vertical aligning plate 39, a semilunar roller 33, a bundle discharge guide 34, and a drive belt 35. The intermediate stacking portion 40 includes an intermediate upper guide 31 and an intermediate lower guide 32, and a plurality of sheets are stacked as a sheet bundle.

The sheet bundle discharged toward the intermediate stacking portion 40 by the kick-out roller 29 including a roller pair is pressed against the intermediate lower guide 32 by the bundle pressing flag 30. As a result, the lifting of the sheet stacked on the intermediate stacking portion 40 is suppressed so that the trailing edge of the sheet stacked on the intermediate stacking portion 40 does not interfere with the leading edge of the subsequent sheet. The semilunar roller 33 rotates based on the detection of the sheet by the pre-intermediate stacking sensor 38, and conveys the sheet toward the vertical aligning plate 39 of the intermediate stacking portion 40. The semilunar roller 33 is adjusted to a conveyance pressure that causes a surface of the sheet abutting on the vertical aligning plate 39 to slip.

Then, the sheet bundle discharged to the intermediate stacking portion 40 is guided downward along the intermediate lower guide 32, and is aligned by the vertical aligning plate 39 provided at the downstream edge portion of the intermediate stacking portion 40 in the sheet conveyance direction. Further, the sheet bundle aligned in the sheet conveyance direction by the vertical aligning plate 39 is aligned in the width direction orthogonal to the sheet conveyance direction by a lateral aligning plate (not illustrated). After such alignment processing is performed, the sheet bundle is pushed out by the bundle discharge guide 34 fixed to the drive belt 35 and delivered to the bundle discharge roller 36 via the second discharge path 64. The sheet bundle is discharged to the outside of the apparatus by a bundle discharge roller 36 as a discharge portion and is stacked on the lower sheet discharge tray 37. Note that the sheet bundle aligned in the intermediate stacking portion 40 may be bound by a stapler (not illustrated).

The upper sheet discharge tray 25 and the lower sheet discharge tray 37 are both movable up and down with respect to the casing of the sheet processing apparatus 4. The sheet processing apparatus 4 includes a sheet surface detection sensor that detects an upper surface position (stacking height of sheets) of sheets in the upper sheet discharge tray 25 and the lower sheet discharge tray 37, and if any of the sensors detects a sheet, the sheet processing apparatus 4 lowers the corresponding tray in the A2 and B2 directions. If the sheet surface detection sensor detects that the sheet in the upper sheet discharge tray 25 or the lower sheet discharge tray 37 has been removed, the tray is lifted in the A1 and B1 directions. Therefore, the upper sheet discharge tray 25 and the lower sheet discharge tray 37 are controlled to ascend and descend so as to keep the upper surfaces of the stacked sheets constant.

Punching Device

Figure 2A:
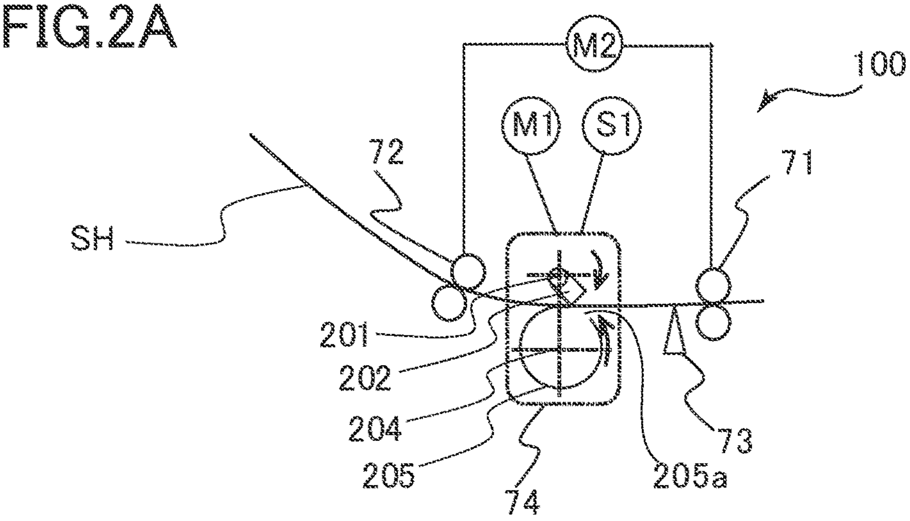
FIG. 2A is a diagram illustrating a punch and a die positioned at a punching start position.
Figure 2B:
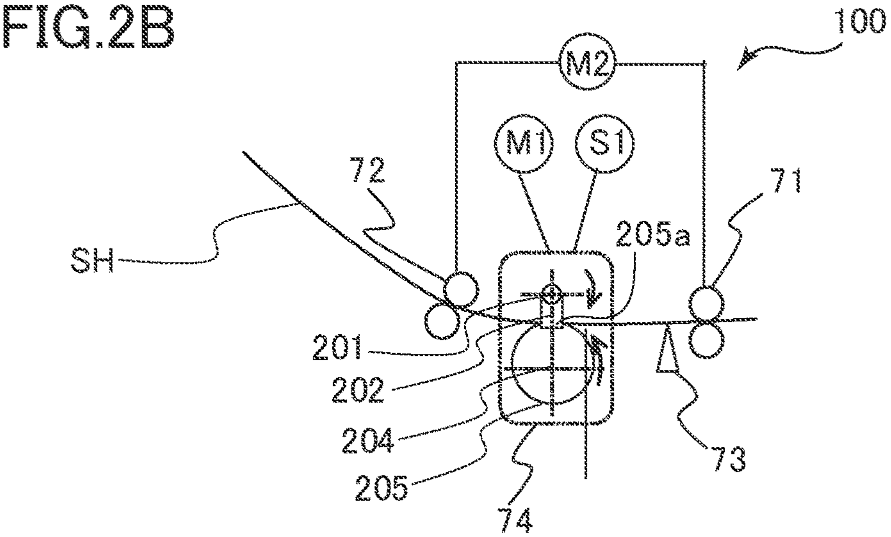
FIG. 2B is a diagram illustrating a punch and a die positioned at a meshing position.
Figure 2C:
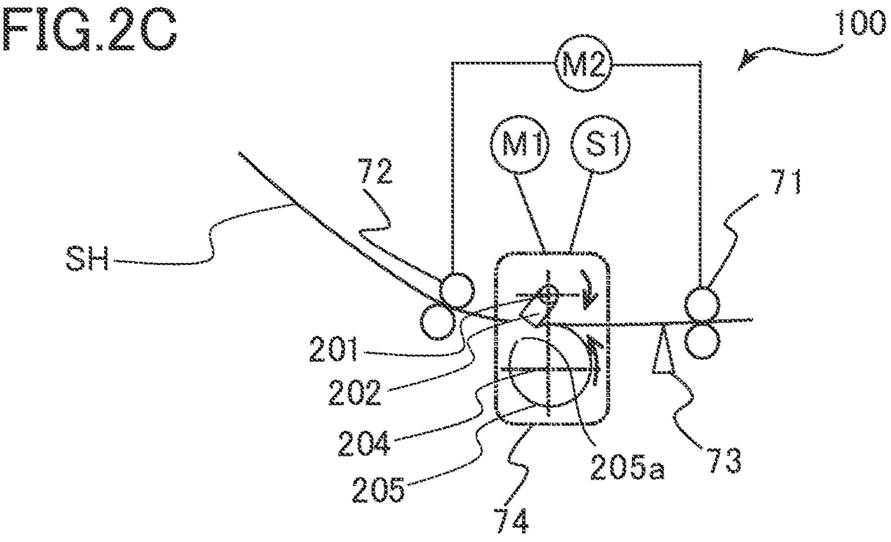
FIG. 2C is a diagram illustrating a punch and a die positioned at a punching end position.

Next, the punching device 100 will be described with reference to FIGS. 2A to 2C. FIG. 2A is a diagram illustrating a punch 202 and a die 205 positioned at a punching start position where the punching of a sheet SH is started. FIG. 2B is a diagram illustrating the punch 202 and the die 205 positioned at a meshing position. FIG. 2C is a schematic view illustrating the punch 202 and the die 205 positioned at a punching end position.

As described above, the punching device 100 includes an inlet roller 71, an outlet roller 72, an inlet sensor 73, and a punch unit 74. The punch unit 74 is a rotary type punch unit that punches a sheet by a rotating punch.

As illustrated in FIG. 2A, the punch unit 74 includes a punch 202 rotatably supported around a punch shaft 201, a die 205 that rotates around a die shaft 204, and a punch HP sensor S1. The die 205 has a die hole **205*a* that can mesh with the punch 202, and the punch shaft 201 and the die shaft 204 mesh with a gear (not illustrated) driven by a punch drive motor M1 as a punch motor. In FIG. 2A, the punch 202 as a punch member is rotationally driven in a clockwise direction by driving of the punch drive motor M1, and the die 205 is rotationally driven in a counterclockwise direction. The punch 202 and the die 205 are disposed between the inlet roller 71 and the outlet roller 72** in the sheet conveyance direction.

In addition, the punch HP sensor S1 detects the rotation position of the punch 202, for example, by detecting a flag that rotates in conjunction with the die shaft 204. In the present embodiment, a transmission type photosensor is used as the punch HP sensor S1, and a stepping motor is used as the punch drive motor M1.

The punch 202 and the die 205 are positioned at home positions at the start and end of an image forming job for forming an image on the sheet SH, and are stopped at the home positions even while no job is input. The punch 202 and the die 205 are disposed at the home positions so as not to hinder conveyance of the sheet. The home position of the punch 202 is a position rotated upstream by a predetermined angle from the meshing position where the punch 202 and the die 205 mesh with each other in the rotation direction. The home position of the punch 202 is detected by the punch HP sensor S1.

As illustrated in FIGS. 2A to 2C, the sheet SH is conveyed at a constant speed by an inlet roller 71 and an outlet roller 72 driven by a conveyance motor M2, and the punch 202 and the die 205 rotate in synchronization with the sheet SH. If the punch 202 and the die 205 are positioned at the meshing positions, the punch 202 meshes with the die hole 205*a* of the die 205, and the sheet SH is punched.

In this manner, the punch 202 and the die 205 stand by at the home positions, and start to be driven by the punch drive motor M1 at a predetermined timing based on detection of the leading edge of the sheet by the inlet sensor 73. At this time, the punch drive motor M1 is controlled so that the peripheral speeds of the punch 202 and the die 205 coincide with the conveying speed of the sheet SH, thereby preventing the sheet from being wrinkled or broken at the time of punching. The punch 202 and the die 205 are separated from the punched sheet at the punching end position.

Drive Transmission Configuration

Figure 3:
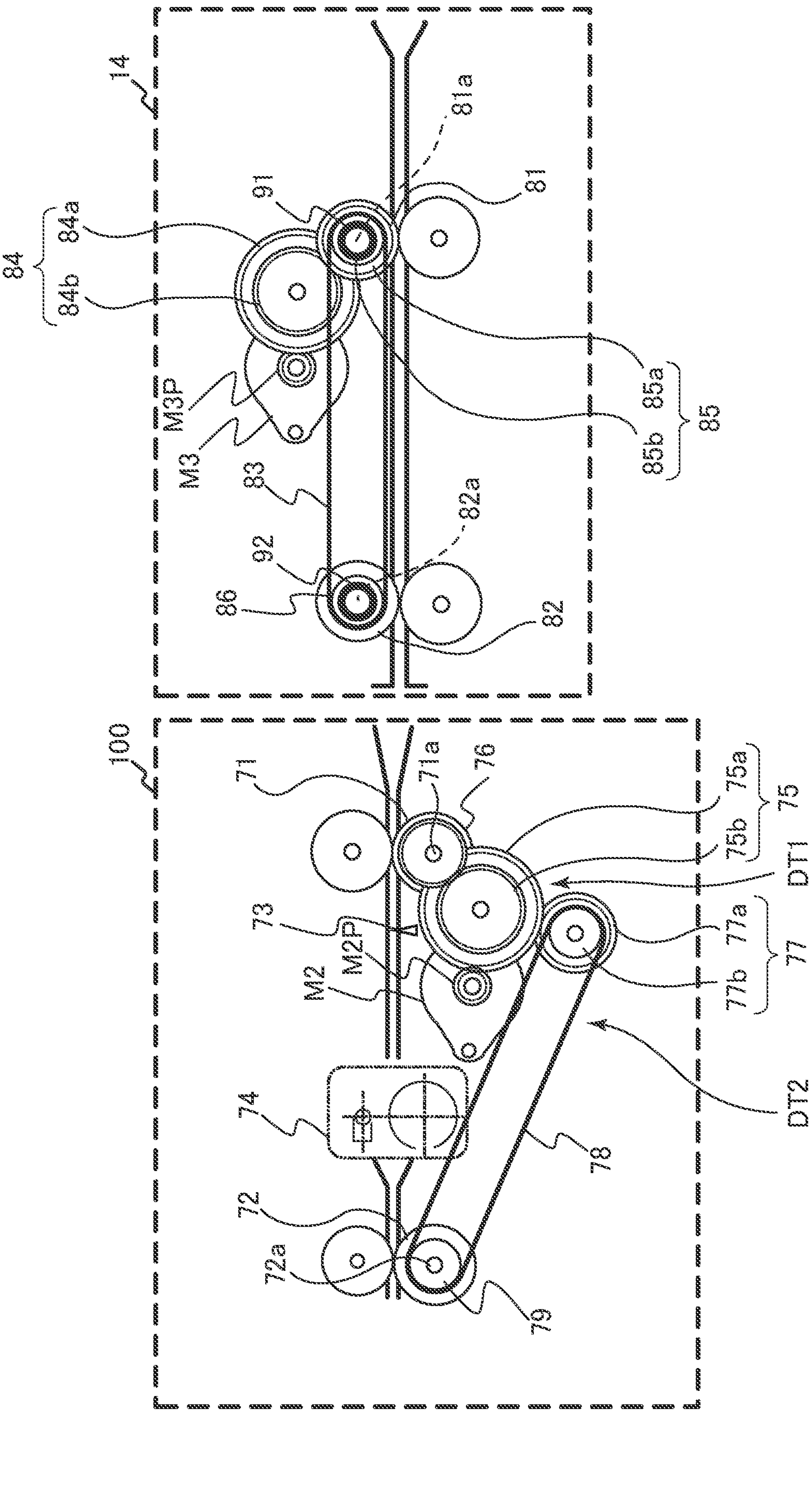
FIG. 3 is a diagram illustrating a drive transmission configuration of a punching device and a horizontal conveyance portion.

Next, drive transmission configurations of the punching device 100 and the horizontal conveyance portion 14 will be described. First, the drive transmission configuration of the punching device 100 will be described. As illustrated in FIG. 3, a pinion gear M2P is fixed to an output shaft of the conveyance motor M2 of the punching device 100, and a large-diameter gear 75*a* of an idler gear 75 meshes with the pinion gear M2P. The idler gear 75 is a gear in which the large-diameter gear 75*a* and a small-diameter gear 75*b* are integrated.

The small-diameter gear 75*b* of the idler gear 75 meshes with the inlet roller gear 76, and an inlet roller gear 76 as an output gear is fixed to a drive shaft 71*a* of the inlet roller 71. In this manner, the conveyance motor M2 drives the inlet roller 71 via the pinion gear M2P, the idler gear 75, and the inlet roller gear 76. In other words, the pinion gear M2P, the idler gear 75, and the inlet roller gear 76 constitute the first drive transmission portion DT1 having a first number of three drive transmission members that sequentially transmit the driving force of the conveyance motor M2 to the inlet roller 71.

The large-diameter gear 75*a* of the idler gear 75 meshes with gear 77*a* of a pulley gear 77. The pulley gear 77 is formed by integrating the gear 77*a* and a pulley 77*b*. A belt 78 is wound around the pulley 77*b* of the pulley gear 77 and the pulley 79 fixed to a drive shaft 72*a* of an outlet roller 72, and the belt 78 transmits the rotation of the pulley 77*b* to the pulley 79. In this manner, the conveyance motor M2 drives the outlet roller 72 via the pinion gear M2P, the idler gear 75, the pulley gear 77, the belt 78, and the pulley 79. In other words, the pinion gear M2P, the idler gear 75, the pulley gear 77, the belt 78, and the pulley 79 constitute the second drive transmission portion DT2 having a second number of five drive transmission members that sequentially transmit the driving force of the conveyance motor M2 to the outlet roller 72. The number (five) of the drive transmission members of the second drive transmission portion DT2 is larger than the number (three) of the drive transmission members of the first drive transmission portion DT1.

In the present embodiment, the pulley gear 77 and the pulley 79 are connected by the belt 78, but a gear may be used instead of the pulley 79 and the belt 78.

Next, drive transmission configurations of the horizontal conveyance portion 14 will be described. A pinion gear M3P is fixed to an output shaft of the conveyance motor M3, and a large-diameter gear 84*a* of an idler gear 84 meshes with the pinion gear M3P. The idler gear 84 is a gear in which the large-diameter gear 84*a* and a small-diameter gear 84*b* are integrated.

The small-diameter gear 84*b* of the idler gear 84 meshes with a gear 85*a* of a conveyance pulley gear 85. The conveyance pulley gear 85 is formed by integrating the gear 85*a* and the pulley 85*b*. The conveyance pulley gear 85 is fixed to a drive shaft 81*a* of the conveyance roller 81. A belt 83 is wound around the pulley 85*b* of the conveyance pulley gear 85 and the pulley 86 fixed to a drive shaft 82*a* of a conveyance roller 82, and the belt 83 transmits the rotation of the pulley 85*b* to the pulley 86. In this manner, the conveyance motor M3 drives the conveyance rollers 81 and 82 via the pinion gear M3P, the idler gear 84, the conveyance pulley gear 85, the belt 83, and the pulley 86.

The one-way clutches 91 and 92 are incorporated in the conveyance pulley gear 85 and the pulley 86, respectively, and the conveyance rollers 81 and 82 are configured to be driven and rotatable with respect to the sheet SH.

Speed Variation of Inlet Roller

Figure 4:
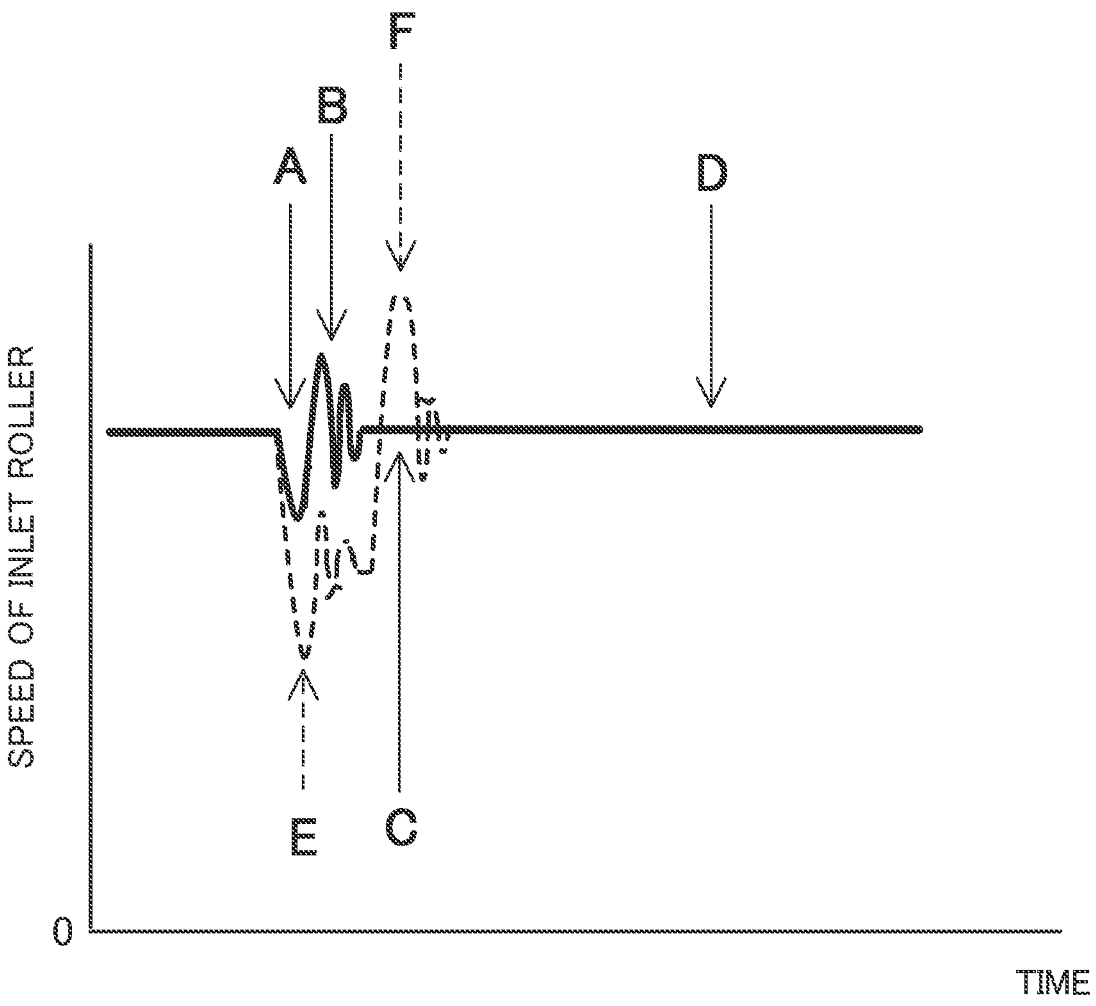
FIG. 4 is a graph illustrating a speed variation of an inlet roller in a series of punching operations of a punch unit.
Figure 5A:
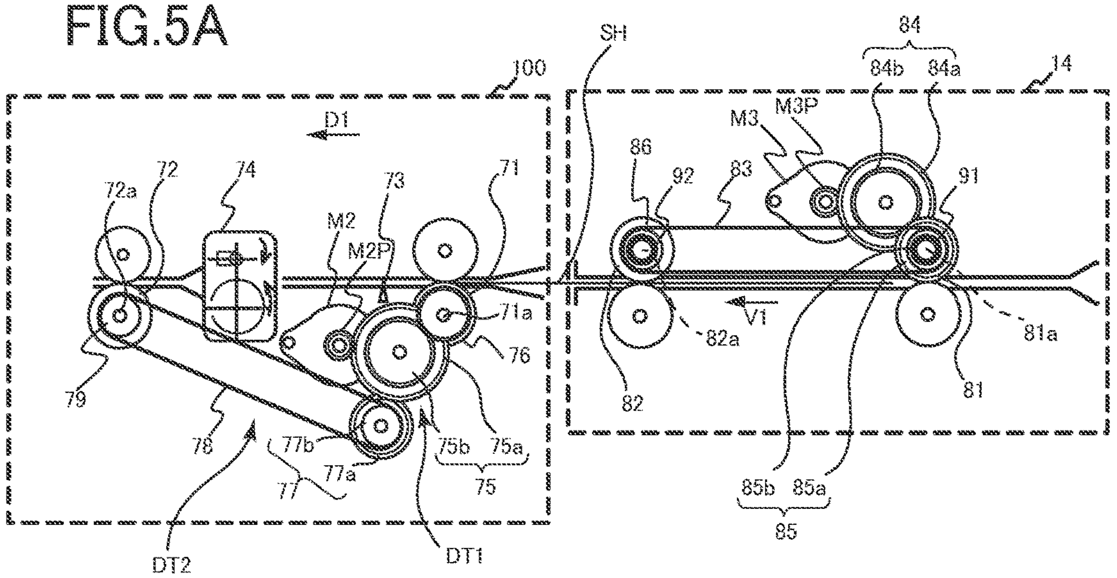
FIG. 5A is a diagram illustrating a state when a sheet enters the inlet roller.
Figure 5B:
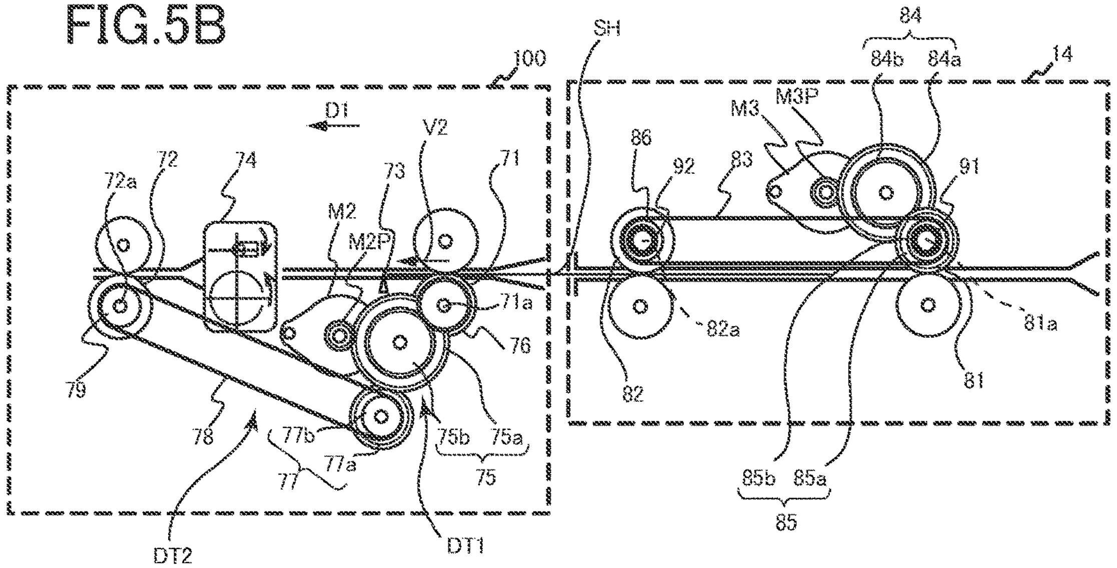
FIG. 5B is a diagram illustrating a state immediately before the inlet sensor detects passage of a leading edge of the sheet.
Figure 5C:
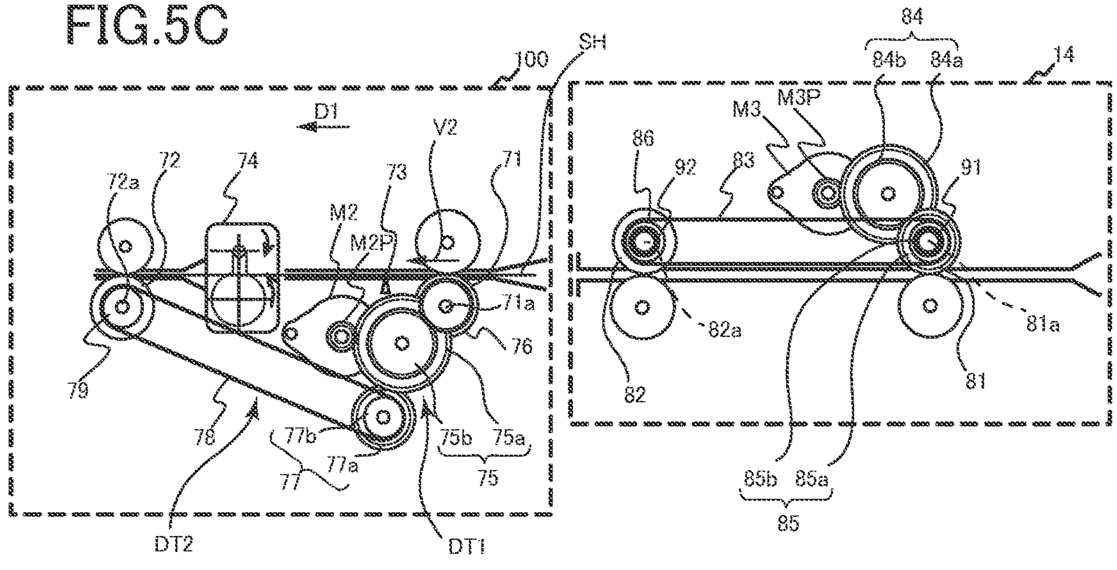
FIG. 5C is a diagram illustrating a state when punching of the sheet is completed.

Next, speed variation of the inlet roller 71 of the punching device 100 will be described. FIG. 4 illustrates the speed variation of the inlet roller 71 in a series of punching operations of the punch unit 74. FIG. 5A is a diagram illustrating a state when the sheet SH enters the inlet roller 71. FIG. 5B is a diagram illustrating a state immediately before the inlet sensor 73 detects passage of a leading edge of the sheet SH. FIG. 5C is a diagram illustrating a state when punching of the sheet SH is completed.

As illustrated in FIG. 5A, if the leading edge of the sheet SH enters the nip of the inlet roller 71, the sheet SH is nipped by the inlet roller 71 and the conveyance roller 82. Since the conveying speed V2 of the sheet by the inlet roller 71 is faster than the conveying speed V1 of the sheet by the conveyance roller 82, the sheet SH is pulled downstream in a sheet conveyance direction D1, and a load of the conveyance motor M2 becomes heavy. The conveying force of the inlet roller 71 is set to be larger than the conveying resistance of the conveyance roller 82.

Then, as illustrated in time A of FIG. 4, the speed of the inlet roller 71 rotating at a predetermined rated speed decreases. The conveyance motor M2 increases the number of rotations in order to rotate the inlet roller 71 at a constant speed, and the speed of the inlet roller 71 increases as illustrated in time B of FIG. 4.

After the leading edge of the sheet SH passes through the inlet roller 71 as illustrated in FIG. 5B, the speed of the inlet roller 71 converges to a predetermined rated speed as illustrated in time C of FIG. 4. Thereafter, the leading edge of the sheet SH passes through the detection position of the inlet sensor 73, and the punch 202 and the die 205 of the punch unit 74 rotate based on the detection result of the inlet sensor 73. That is, the time C at which the speed of the inlet roller 71 converges to the predetermined rated speed is a timing before the leading edge of the sheet SH passes through the detection position of the inlet sensor 73.

As illustrated in FIG. 5C, the speed of the inlet roller 71 is maintained at the rated speed as illustrated in time D in FIG. 4 even in a state where the punching into the sheet SH is completed. That is, as illustrated in FIG. 5B, before the leading edge of the sheet SH passes through the detection position of the inlet sensor 73, the speed of the inlet roller 71 is stabilized at the rated speed, so that the drive start timing of the punch unit 74 is stabilized. Therefore, it is possible to reduce a deviation in timing at which the punch 202 punches the sheet SH, and it is possible to improve punching accuracy of the sheet SH.

Here, a speed variation of the inlet roller 71 in a comparative example in a case where another drive transmission member such as a belt is added to a drive train between the conveyance motor M2 and the inlet roller 71 will be described. The broken line in FIG. 4 indicates the speed variation of the inlet roller 71 in this comparative example. In a case where a belt is added to the drive train between the conveyance motor M2 and the inlet roller 71, a drive transmission loss occurs due to bending of the belt.

If the leading edge of the sheet SH enters the nip of the inlet roller 71, the speed of the inlet roller 71 greatly decreases as illustrated in time E of FIG. 4. The conveyance motor M2 increases the number of rotations in order to rotate the inlet roller 71 at a constant speed, and greatly increases the speed of the inlet roller 71 as illustrated in time F of FIG. 4. As described above, in the comparative example, the speed variation of the inlet roller 71 is larger than that in the present embodiment.

Therefore, it takes more time than in the present embodiment until the speed of the inlet roller 71 is stabilized at the rated speed, and the speed of the inlet roller 71 does not converge to the rated speed even at time C when the leading edge of the sheet SH passes through the detection position of the inlet sensor 73. For this reason, the time from when the leading edge of the sheet SH is detected by the inlet sensor 73 to when the sheet SH is punched by the punch 202 is not stabilized, and the punching timing is shifted. Therefore, in the comparative example, punching cannot be performed at a desired punching position, and the punching accuracy into the sheet is reduced.

As described above, in the present embodiment, the drive transmission configuration from the conveyance motor M2 to the inlet roller 71 includes the pinion gear M2P, the idler gear 75, and the inlet roller gear 76, and the number of gears as the drive transmission members is small. In addition, the gear has less drive transmission loss such as slippage than a belt or the like, and can directly transmit the driving force. Therefore, the speed variation of the inlet roller 71 if the leading edge of the sheet SH enters the inlet roller 71 can be suppressed.

Therefore, the inlet roller 71 as the first conveyance rotary member rotates at a rated speed so that the sheet SH can be conveyed at the conveying speed V2 after the leading edge of the sheet SH passes through the inlet roller 71 and before the leading edge reaches the detection position of the inlet sensor 73. That is, the inlet roller 71 performs rated rotation to convey the sheet SH at the conveying speed V2. Therefore, it is possible to reduce a deviation in timing at which the punch 202 punches the sheet SH, and it is possible to improve punching accuracy of the sheet SH.

In the present embodiment, the rotation of the conveyance motor M2 is transmitted to the inlet roller 71 via the pinion gear M2P, the idler gear 75, and the inlet roller gear 76, but the present invention is not limited thereto. For example, the idler gear 75 may be omitted, and the pinion gear M2P as a gear may mesh with the inlet roller gear 76. Further, a plurality of idler gears may be provided between the pinion gear M2P and the inlet roller gear 76. However, the smaller the number of idler gears between the pinion gear M2P and the inlet roller gear 76, the more the driving force can be directly transmitted.

Second Embodiment

Next, a second embodiment of the present invention will be described; however, in the second embodiment, the idler gear 75 of the first embodiment is replaced with a scissors gear 200. Therefore, a configuration similar to that of the first embodiment will be described by omitting illustration or attaching the same reference numerals to the drawings.

Figure 6:
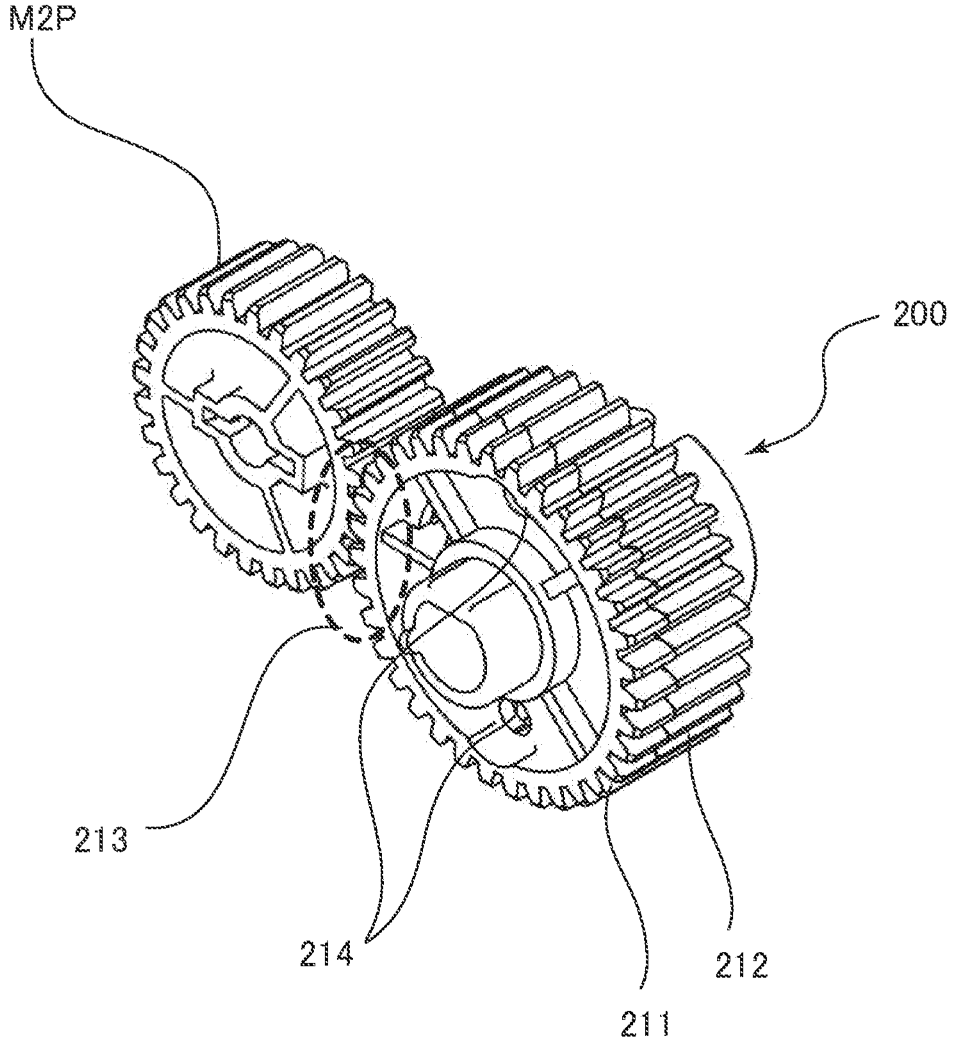
FIG. 6 is a perspective view illustrating a scissors gear according to a second embodiment.

As illustrated in FIG. 6, the pinion gear M2P of the conveyance motor M2 (refer to FIG. 3) meshes with the scissors gear 200. The scissors gear 200 meshes with the inlet roller gear 76 and the pulley gear 77 (refer to FIG. 3). The scissors gear 200 has two gears 211 and 212 arranged coaxially, and the gears 211 and 212 as the first gear and the second gear are fixed in a state where phases thereof are shifted from each other by a fixing portion 214.

Figure 7:
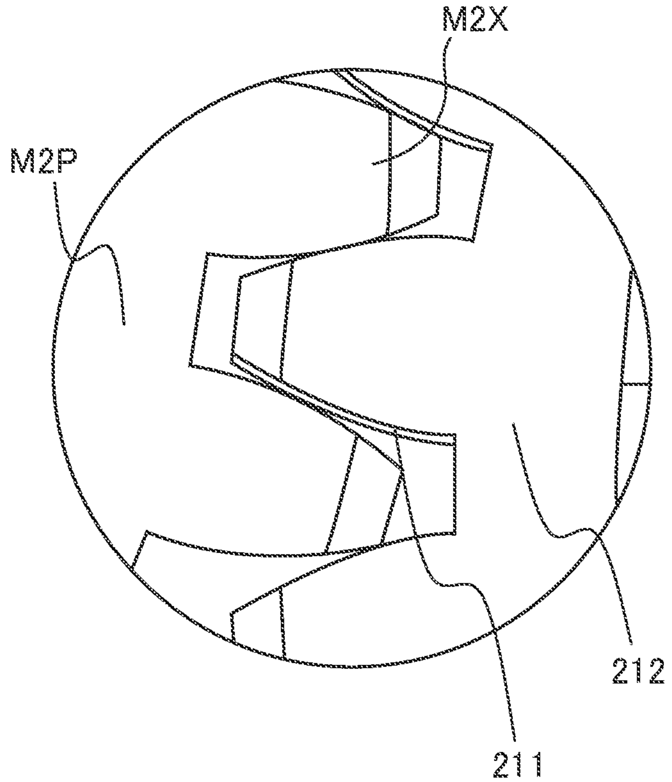
FIG. 7 is an enlarged view illustrating a broken line portion in FIG. 6.

FIG. 7 is an enlarged view illustrating a broken line portion 213 in FIG. 6. As illustrated in FIG. 7, the gears 211 and 212 of the scissors gear 200 are out of phase with each other so as to sandwich a teeth M2X of the pinion gear M2P. On one side of the teeth M2X, there is no gap (backlash) between the teeth M2X and the gear 211, and on the other side of the teeth M2X, there is no gap (backlash) between the teeth M2X and the gear 212. Accordingly, the scissors gear 200 can eliminate backlash from the pinion gear M2P.

As described above, in the present embodiment, by using the scissors gear 200 in the drive transmission configuration between the conveyance motor M2 and the inlet roller 71, backlash between the pinion gear M2P and the scissors gear 200 can be eliminated. Thus, the driving force of the conveyance motor M2 is directly transmitted to the inlet roller 71, and the speed variation of the inlet roller 71 when the sheet SH enters the inlet roller 71 can be reduced. Therefore, the punching accuracy for the sheet SH can be improved.

OTHER EMBODIMENTS

In any of the embodiments described above, the one-way clutches 91 and 92 are provided so that the conveyance rollers 81 and 82 can rotate following the sheet SH conveyed at the conveying speed V2 by the inlet roller 71, but the present invention is not limited thereto. For example, instead of providing the one-way clutches 91 and 92, the conveyance rollers 81 and 82 may be configured to be movable so that the nip between the conveyance rollers 81 and 82 can be released.

In any of the embodiments described above, an image forming apparatus 1 of an electrophotographic system has been described, but the present invention is not limited thereto. For example, the present invention can also be applied to a sheet processing apparatus connected to an inkjet type image forming apparatus that forms an image on a sheet by ejecting ink liquid from a nozzle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-076349, filed Apr. 28, 2021, which is hereby incorporated by reference herein in its entirety.

What is claimed is:

1. A sheet processing apparatus comprising:

a first conveyance rotary member configured to convey a sheet in a sheet conveyance direction;

a second conveyance rotary member disposed downstream of the first conveyance rotary member in the sheet conveyance direction and configured to convey the sheet;

a punch member disposed between the first conveyance rotary member and the second conveyance rotary member in the sheet conveyance direction and configured to perform punching on the sheet conveyed by the first conveyance rotary member while rotating;

a sensor disposed between the first conveyance rotary member and the punch member in the sheet conveyance direction and configured to change an output value based on presence or absence of the sheet at a detection position;

a punch motor configured to be driven based on a detection result of the sensor and drive the punch member;

a conveyance motor configured to drive the first conveyance rotary member and the second conveyance rotary member;

a first drive transmission portion including a first number of drive transmission members configured to sequentially transmit driving force of the conveyance motor to the first conveyance rotary member; and a second drive transmission portion including a second number of drive transmission members configured to sequentially transmit driving force of the conveyance motor to the second conveyance rotary member, the second number being larger than the first number, wherein the first conveyance rotary member and the second conveyance rotary member convey the sheet, conveyed at a first speed in a position upstream of the first conveyance rotary member in the sheet conveyance direction, at a second speed higher than the first speed, and wherein the first conveyance rotary member performs rated rotation to convey the sheet at the second speed after a leading edge of the sheet passes through the first conveyance rotary member and before the leading edge reaches the detection position of the sensor.

2. An image forming system comprising:

an image forming apparatus configured to form an image on a sheet; and the sheet processing apparatus according to claim 1, which is configured to receive a sheet from the image forming apparatus.

3. The image forming system according to claim 2, wherein the image forming apparatus includes:

a third conveyance rotary member configured to deliver the sheet to the first conveyance rotary member;

a motor configured to drive the third conveyance rotary member[H]i and a one-way clutch provided in a drive transmission path between the motor and the third conveyance rotary member.

4. The image forming system according to claim 3, wherein a conveying force of the first conveyance rotary member is larger than a conveying resistance of the third conveyance rotary member.

5. The sheet processing apparatus comprising:

a first conveyance rotary member disposed in a first conveyance path and configured to convey a sheet in a sheet conveyance direction;

a second conveyance rotary member disposed in the first conveyance path and downstream of the first conveyance rotary member in the sheet conveyance direction and configured to convey the sheet;

a punch member disposed in the first conveyance path, between the first conveyance rotary member and the second conveyance rotary member in the sheet conveyance direction, and configured to perform punching on the sheet conveyed by the first conveyance rotary member while rotating;

a sensor disposed between the first conveyance rotary member and the punch member in the sheet conveyance direction and configured to change an output value based on presence or absence of the sheet at a detection position;

a punch motor configured to be driven based on a detection result of the sensor and drive the punch member;

a conveyance motor configured to drive the first conveyance rotary member and the second conveyance rotary member;

a first drive transmission portion including a first number of drive transmission members configured to sequentially transmit driving force of the conveyance motor to the first conveyance rotary member;

a second drive transmission portion including a second number of drive transmission members configured to sequentially transmit driving force of the conveyance motor to the second conveyance rotary member, the second number being larger than the first number;

a reversing portion configured to reverse the sheet received from the first conveyance path;

a stacking portion on which the sheet reversed by the reversing portion is stacked;

a second conveyance path extending below the first conveyance path and configured to receive the sheet reversed by the reversing portion and guide the sheet to the stacking portion;

a discharge portion configured to discharge the sheet to outside of the apparatus;

a third conveyance path extending from the stacking portion toward the discharge portion and configured to guide the sheet to the discharge portion; and a rotary member pair disposed in the second conveyance path and configured to discharge the sheet to the stacking portion.

6. A sheet processing apparatus comprising:

a first conveyance rotary member configured to convey a sheet in a sheet conveyance direction;

a second conveyance rotary member disposed downstream of the first conveyance rotary member in the sheet conveyance direction and configured to convey the sheet;

a punch member disposed between the first conveyance rotary member and the second conveyance rotary member in the sheet conveyance direction and configured to perform punching on the sheet conveyed by the first conveyance rotary member while rotating;

a sensor disposed between the first conveyance rotary member and the punch member in the sheet conveyance direction and configured to change an output value based on presence or absence of the sheet at a detection position;

a punch motor configured to be driven based on a detection result of the sensor and drive the punch member;

a conveyance motor configured to drive the first conveyance rotary member and the second conveyance rotary member;

a pinion gear fixed to an output shaft of the conveyance motor;

an output gear fixed to a drive shaft of the first conveyance rotary member; and an idler gear configured to mesh with the pinion gear and the output gear.

7. The sheet processing apparatus according to claim 6, wherein the first conveyance rotary member and the second conveyance rotary member convey the sheet, conveyed at a first speed in a position upstream of the first conveyance rotary member in the sheet conveyance direction, at a second speed higher than the first speed.

8. The sheet processing apparatus according to claim 7, wherein the first conveyance rotary member performs rated rotation to convey the sheet at the second speed after a leading edge of the sheet passes through the first conveyance rotary member and before the leading edge reaches the detection position of the sensor.

9. The sheet processing apparatus according to claim 6, further comprising:

a first conveyance path configured to receive a sheet;

a reversing portion configured to reverse the sheet received from the first conveyance path;

a stacking portion on which the sheet reversed by the reversing portion is stacked;

a second conveyance path extending below the first conveyance path and configured to receive the sheet reversed by the reversing portion and guide the sheet to the stacking portion;

a discharge portion configured to discharge the sheet to outside of the apparatus;

a third conveyance path extending from the stacking portion toward the discharge portion and configured to guide the sheet to the discharge portion; and a rotary member pair disposed in the second conveyance path and configured to discharge the sheet to the stacking portion.

10. The sheet processing apparatus according to claim 9, wherein the punch member is disposed in the first conveyance path.

11. The sheet processing apparatus according to claim 6, wherein the idler gear is a scissors gear including a first gear and a second gear fixed to the first gear with a phase different from that of the first gear.

12. An image forming system comprising:

an image forming apparatus configured to form an image on a sheet; and the sheet processing apparatus according to claim 6, which is configured to receive a sheet from the image forming apparatus.

13. The image forming system according to claim 12, wherein the image forming apparatus includes:

a third conveyance rotary member configured to deliver the sheet to the first conveyance rotary member;

a motor configured to drive the third conveyance rotary member; and a one-way clutch provided in a drive transmission path between the motor and the third conveyance rotary member.

14. The image forming system according to claim 13, wherein a conveying force of the first conveyance rotary member is larger than a conveying resistance of the third conveyance rotary member.

15. A sheet processing apparatus comprising:

a first conveyance rotary member configured to convey a sheet in a sheet conveyance direction;

a second conveyance rotary member disposed downstream of the first conveyance rotary member in the sheet conveyance direction and configured to convey the sheet;

a punch member disposed between the first conveyance rotary member and the second conveyance rotary member in the sheet conveyance direction and configured to perform punching on the sheet conveyed by the first conveyance rotary member while rotating;

a sensor disposed between the first conveyance rotary member and the punch member in the sheet conveyance direction and configured to change an output value based on presence or absence of the sheet at a detection position;

a punch motor configured to be driven based on a detection result of the sensor and drives the punch member;

a conveyance motor configured to drive the first conveyance rotary member and the second conveyance rotary member;

an output gear fixed to a drive shaft of the first conveyance rotary member; and a gear fixed to an output shaft of the conveyance motor and meshes with the output gear.

16. The sheet processing apparatus according to claim 15, wherein the first conveyance rotary member and the second conveyance rotary member convey the sheet, conveyed at a first speed in a position upstream of the first conveyance rotary member in the sheet conveyance direction, at a second speed higher than the first speed.

17. The sheet processing apparatus according to claim 16, wherein the first conveyance rotary member performs rated rotation to convey the sheet at the second speed after a leading edge of the sheet passes through the first conveyance rotary member and before the leading edge reaches the detection position of the sensor.

18. The sheet processing apparatus according to claim 15, further comprising:

a first conveyance path configured to receive a sheet;

a reversing portion configured to reverse the sheet received from the first conveyance path;

a stacking portion on which the sheet reversed by the reversing portion is stacked;

a second conveyance path extending below the first conveyance path and configured to receive the sheet reversed by the reversing portion and guide the sheet to the stacking portion;

a discharge portion configured to discharge the sheet to outside of the apparatus;

a third conveyance path extending from the stacking portion toward the discharge portion and configured to guide the sheet to the discharge portion; and a rotary member pair disposed in the second conveyance path and configured to discharge the sheet to the stacking portion.

19. The sheet processing apparatus according to claim 18, wherein the punch member is disposed in the first conveyance path.

20. An image forming system comprising:

an image forming apparatus configured to form an image on a sheet; and the sheet processing apparatus according to claim 15, which is configured to receive a sheet from the image forming apparatus.

21. The image forming system according to claim 20, wherein the image forming apparatus includes:

a third conveyance rotary member configured to deliver the sheet to the first conveyance rotary member;

a motor configured to drive the third conveyance rotary member[H]i and a one-way clutch provided in a drive transmission path between the motor and the third conveyance rotary member.

22. The image forming system according to claim 21, wherein a conveying force of the first conveyance rotary member is larger than a conveying resistance of the third conveyance rotary member.

* * * * *